United States Patent [19]

Le Marrec et al.

[11] Patent Number: 4,808,043
[45] Date of Patent: Feb. 28, 1989

[54] APPARATUS FOR DISTRIBUTION OF GAS-ENTRAINED POWDERS

[75] Inventors: Claude Le Marrec, Asnieres, France; Carl Kramer; Hans W. Kuster, both of Aachen, Fed. Rep. of Germany

[73] Assignee: Saint-Gobain Vitrage, Courbevoie, France

[21] Appl. No.: 18,745

[22] Filed: Mar. 2, 1987

Related U.S. Application Data

[63] Continuation-in-part of Ser. No. 627,592, Jul. 3, 1984, abandoned.

[30] Foreign Application Priority Data

Jul. 4, 1983 [FR] France ................... 83 11059

[51] Int. Cl.$^4$ ............................ B65G 53/52
[52] U.S. Cl. ........................... 406/181; 406/151; 406/155; 239/113
[58] Field of Search ............... 406/181, 151–153, 406/155; 239/113, 552; 193/25, 29; 137/561 A

[56] References Cited

U.S. PATENT DOCUMENTS

| 940,313 | 11/1909 | Harding et al. | 406/181 X |
| 1,413,727 | 4/1922 | Hanly | 406/181 X |
| 1,871,853 | 8/1932 | Kennedy | 406/181 |
| 3,189,230 | 6/1965 | Gillespie | 406/181 X |
| 3,265,442 | 8/1966 | Willis, Jr. et al. | 406/181 |
| 3,267,891 | 8/1966 | Hemker | 406/181 X |
| 3,640,472 | 2/1972 | Hruby et al. | 239/552 |
| 4,191,500 | 3/1980 | Oberg et al. | 406/181 |
| 4,230,271 | 10/1980 | Marcault | 239/113 |
| 4,413,935 | 11/1983 | Smith et al. | 406/181 |

FOREIGN PATENT DOCUMENTS

| 006064 | 12/1979 | European Pat. Off. | 239/113 |
| 039256 | 3/1981 | European Pat. Off. | 239/113 |
| 2950283 | 10/1979 | Fed. Rep. of Germany | 239/113 |
| 2475649 | 9/1981 | France | 239/113 |
| 38222 | 3/1982 | Japan | 406/151 |
| 2081136 | 2/1982 | United Kingdom | 406/181 |

Primary Examiner—Sherman D. Basinger
Assistant Examiner—Paul E. Salmon
Attorney, Agent, or Firm—Pennie & Edmonds

[57] ABSTRACT

Apparatus is described for subdividing a single stream of powder products entrained in a gas into a plurality of secondary streams. The apparatus comprises an array of identical ducts (33, 47) distributed over the lateral surface of a cone (34, 43) having a circular section, said ducts converging in the vicinity of the apex (35, 44) of the cone to constitute a single intake (36, 41) directed along the axis of the cone and connected to a primary intake pipe (11), said ducts being oriented along the generatrices of the cone and ending at its base in a multiplicity of orifices each connected to a secondary conduit (31) carrying one of the secondary streams.

29 Claims, 5 Drawing Sheets

APPARATUS FOR DISTRIBUTION OF GAS-ENTRAINED POWDERS

This is a continuation-in-part of application Ser. No. 627,592, filed July 3, 1984, now abandoned.

CROSS-REFERENCE TO RELATED APPLICATIONS

Related applications are application Ser. Nos. 588,329 and 588,330 (now U.S. Pat. No. 4,533,571), filed Mar. 12, 1984 and assigned to the assignee of the present invention, which are incorporated herein by reference.

BACKGROUND OF INVENTION

This invention relates to the distribution of powder products and more precisely to the subdivision of a single main stream of powder products entrained in a gas into a multiplicity of secondary streams. The invention is particularly useful for feeding secondary streams to different spots along the length of a slit nozzle for coating a substrate such as a glass plate or ribbon.

Patent No. EP0,006,064 describes an installation for coating glass in which a slit nozzle uniformly distributes a powdered metal compound onto a hot glass ribbon so as to obtain, after pyrolysis of the powder in contact with the hot glass, a coating layer having particular optical and electrical properties. The slit nozzle is fed over its entire length by a multiplicity of feed conduits formed by dividing a single primary intake pipe carrying the powder entrained in a gas.

The standard means of subdividing the single primary pipe into a multiplicity of secondary conduits are generally satisfactory. However, when the number of secondary conduits becomes too great, for example, when excellent uniformity of distribution is required, and it is necessary to feed a slit nozzle covering three or four meters in width of an industrially produced glass ribbon, these standard means may not be sufficient. Specifically, they introduce too great pressure losses and have a tendency to clog and become destabilized.

SUMMARY OF INVENTION

The present invention improves the distribution of powder products by inserting a distributor between the single primary pipe carrying the single, vertical stream and the multiple secondary conduits conducting the secondary streams. The distributor divides the input stream into as many identical secondary streams as there are secondary conduits to feed.

The distributor is made of an array of identical ducts distributed over the lateral surface of a cone with a circular section, said ducts converging in the vicinity of the apex of the cone to constitute a single input directed along the axis of the cone and connected to the primary pipe, said ducts being oriented along generatrices of the cone and ending at its base in a multiplicity of orifices each connected to a secondary conduit.

In a first embodiment, the ducts are circular in section and are obtained by piercing through a solid.

In a second preferred embodiment, the distributor consists of a housing having a cavity that flares outward from its intake and a conical core mounted within the cavity, the lateral wall of the conical core comprising a multiplicity of identical grooves oriented along the generatrices of the cone, said grooves and the inside surface of the housing forming the array of identical ducts.

Advantageously, these distributors are mounted vertically in alignment with the single vertical primary pipe for carrying the gas-entrained powder stream. This pipe must be substantially straight so that the distribution of powder is not affected by action of gravity.

The distributors may be used to divide a single stream of a gaseous or liquid fluid, or a suspension of a solid or liquid, into a multiplicity of identical secondary streams. In particular, a suspension of a powder, for example a metal compound in a gas, can be subdivided and used to feed a slit nozzle at various spots along its length so as to coat a substrate, particularly a glass ribbon, with a layer of said compound or a product resulting from decomposition of said compound.

To avoid clogging and to permit preservation of the concentration of the suspension, the angle at the apex of the cone is small, being at angles greater than 22°, the stream of powder-entrained particles has a tendency to detach itself from the walls of the ducts located upon the surface of the distributor. This frequently leads to the formation of particle agglomerations which have a negative effect on the optical properties of the coating thus produced. In addition, a constant cross-section is advantageously maintained throughout the flow passages of the distributor so that the cross-sections of the ducts at all points along these ducts is the same and is substantially equal to the cross-section of the primary intake pipe.

Such a construction avoids too sudden a change in the direction of flow which could directly cause segregations, cloggings, and modifications in the concentration of the suspension and also avoids pressure changes that might cause losses in speed of flow that might result in additional cloggings.

The result is an improvement in the uniformity of the distribution of the suspension in the secondary conduits and the ability to maintain this uniformity over time, thereby improving, for example, the uniformity in space and time of the powder sheet directed by a slit nozzle at a substrate so as to improve the quality of the coating formed by such process on the substrate.

BRIEF DESCRIPTION OF THE DRAWINGS

These and other objects, features and advantages of the invention will be more readily apparent from the following detailed description of preferred embodiments in which.

DETAILED DESCRIPTION OF PREFERRED EMBODIMENTS

Figure 1:
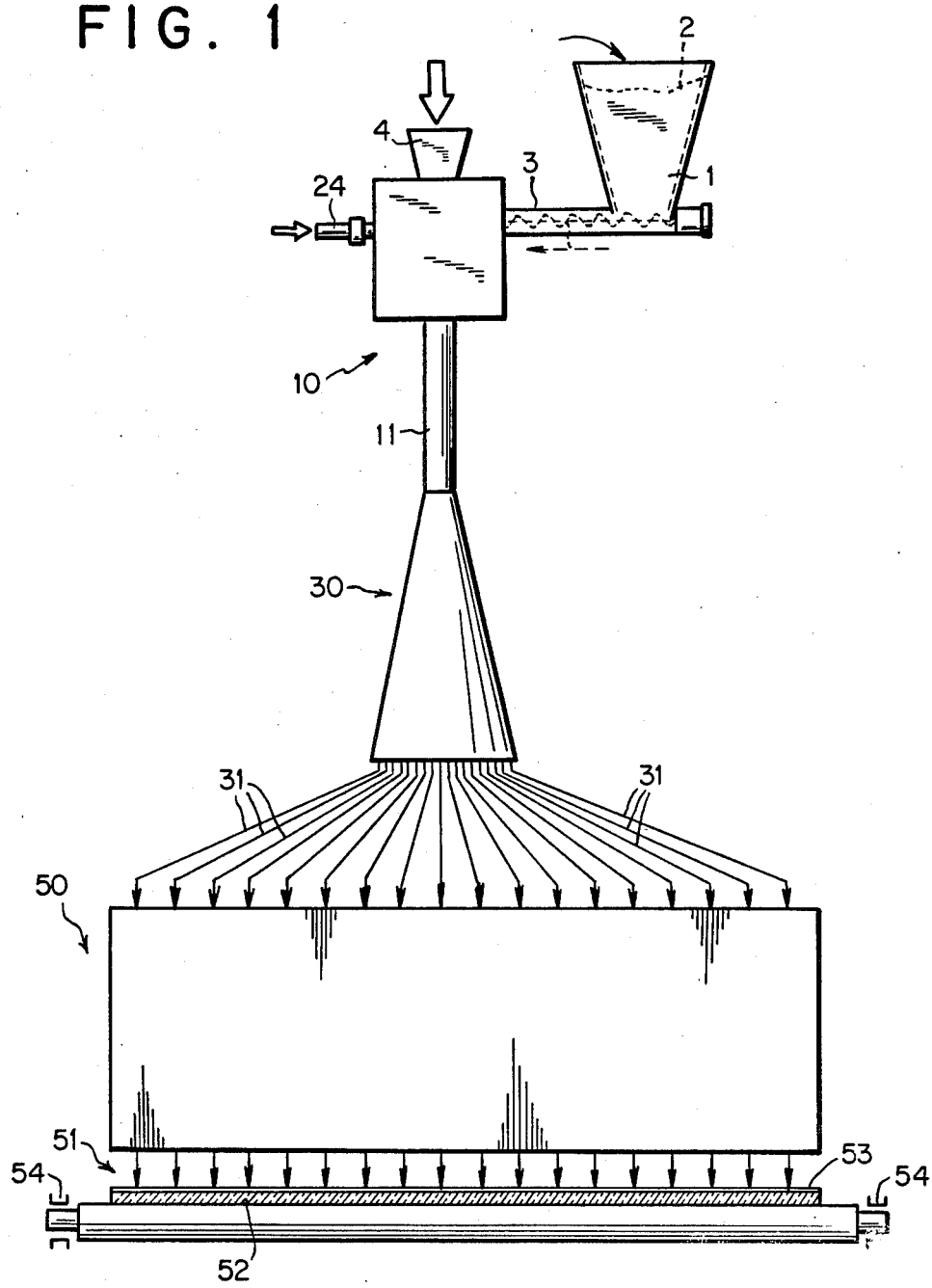
FIG. 1 is a general diagrammatic view of an illustrative embodiment of an installation for coating a substrate with powder.

The apparatus described in FIG. 1 may be used to distribute various powders (e.g., organometallic compounds, inks, pigments . . . ) evenly on substrates such as glass, metal, wood, paper. It can be used in particular to distribute a powdered metal compound on a glass substrate so as to provide a coating layer having particular optical, electrical, or decorative properties, resulting from the thermal decomposition of the metal compound in contact with heated glass. The layers generally deposited on the glass are layers having a base of tin, indium, titanium, chromium, iron, cobalt, and may be doped, for example, with fluorine. More specifically, metal compounds, such as dibutyltin difluoride described in European patent No. 0,039,256, dibutyltin oxide, metal acetyl acetonates, methyl titanate, etc., may be used.

This apparatus comprises a funnel-shaped hopper 1 for storing a powder 2 to be distributed, a mixer 10 in which powder 2 is mixed with a gas, generally air, to form a substantially straight homogeneous suspension of powder entrained in gas; a primary intake pipe 11 conducting the suspension from mixer 10; a distributor 30 oriented in vertical alignment with pipe 11, for subdividing the single stream of suspension from pipe 11 into a multiplicity of secondary streams; a multiplicity of secondary conduits 31, each carrying one of the secondary streams; and a distribution nozzle 50 that is fed by a predetermined number of secondary conduits 31 with the suspension of powder in gas at different points along its length. The number of secondary conduits 31 can be quite large. Thus, it is entirely practical to use distributors that subdivide a single main stream into about seventy-five secondary streams. A greater or lesser number of distributors may, of course, be used. It has in fact been found to be particularly advantageous to use between about 15 and 25 streams per meter of float glass width to be coated.

Nozzle 50 is the type of nozzle described in the above-referenced Ser. Nos. 588,329 and 588,330 applications that forms the powder suspension from secondary conduits 31 into a continuous sheet 51 of powder that is exhausted from the distal end of the nozzle toward a substrate 52, such as a plate or a continuous ribbon of glass that is moving transversely to said sheet on rollers 54. Nozzle 50 is designed so as to produce a sheet that is continuous from one side to the other of nozzle 50 and is fed at a continuous rate so as to coat substrate 52 with a substantially uniform layer 53 having particular electrical, optical and/or decorative properties.

Figure 2:
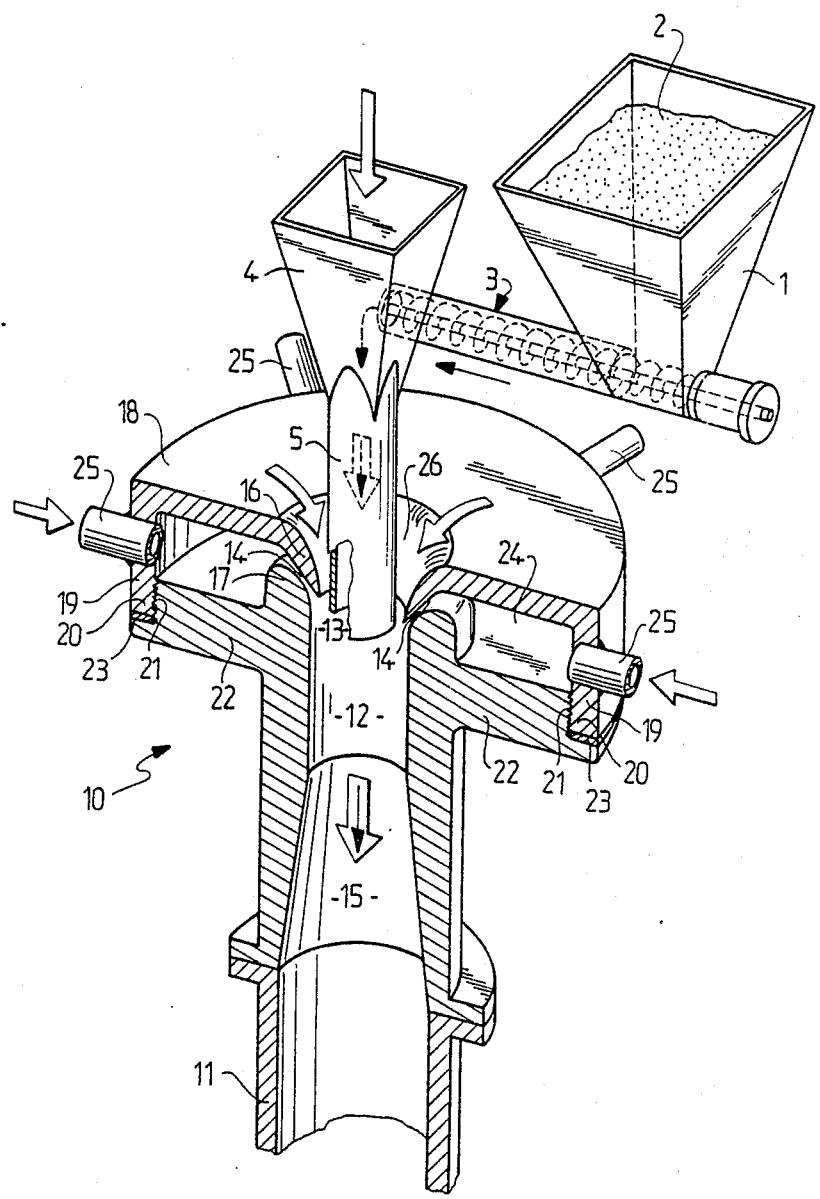
FIG. 2 is a perspective view, partially in section, of a mixer for making a suspension of powder in a gas.
Figure 3A:
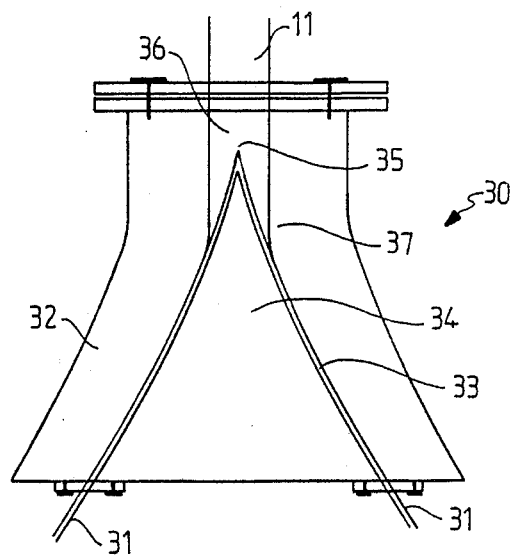
FIG. 3A is a diagrammatic view and FIG. 3B is a bottom view of a first embodiment of a distributor for subdividing a single intake pipe into a multiplicity of conduits.
Figure 3B:
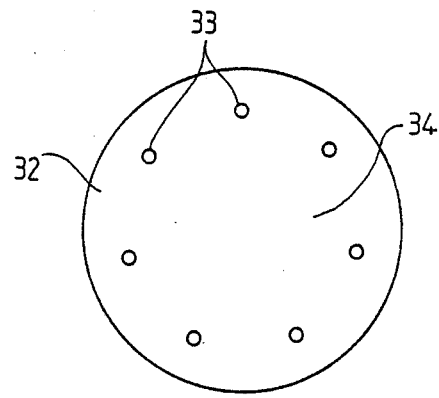
Figure 4:
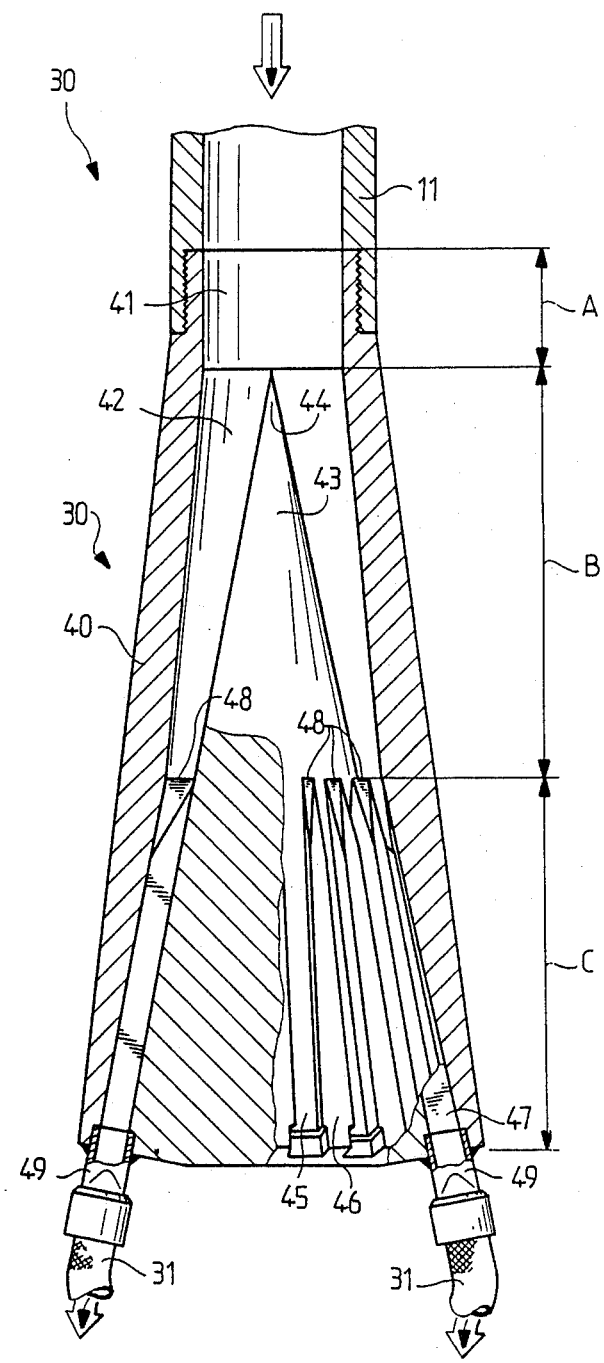
FIG. 4 is a sectional view of a second embodiment of a distributor for subdividing a single intake pipe into a mutliplicity of conduits.
Figure 5:
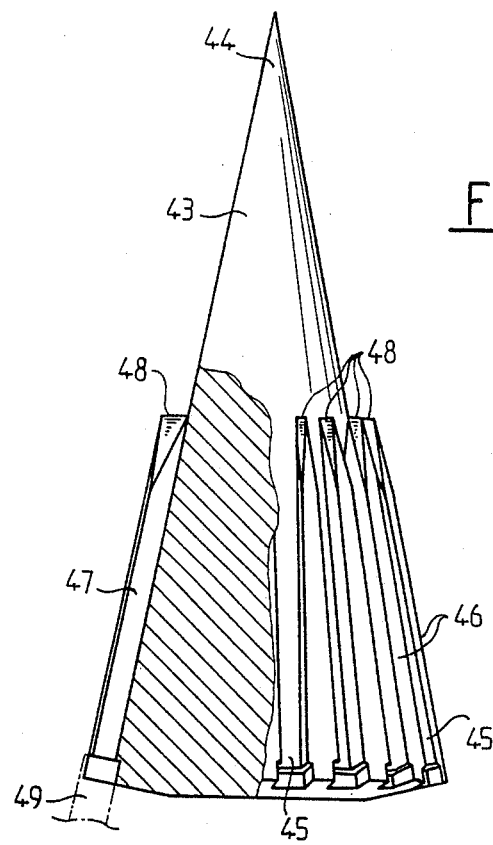
FIG. 5 is a side view of a core contained inside the distributor of FIG. 4.
Figure 6:
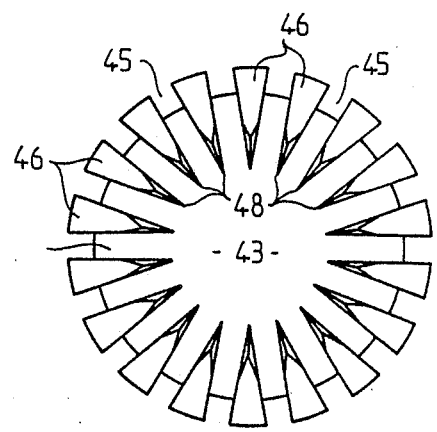
FIG. 6 is a top view of the core of FIG. 5.

Hopper 1 and mixer 10 are shown in more detail in FIG. 2. Powder 2 is removed from the bottom of hopper 1 by a worm screw 3 that feeds the powder into a container 4 from which it falls into mixer 10 through a cylindrical pipe 5. An intake for the gas intended to be mixed with powder 2 is provided through the upper end of container 4. Where this gas is air, as is typical, it is sufficient that container 4 have a funnel shaped opening at its upper end as shown in FIG. 2, thus allowing the ambient air to enter and achieve a premixing of the powder with air. This premixing of powder in gas, and generally in air, is performed by pipe 5 at the input of mixer 10.

Mixer 10 comprises a cylindrical mixing zone 12, a pressurized gas injector 13 surmounting mixing zone 12, and a conical stabilization zone 15 located under mixing zone 12 and adjoining it. Pressurized gas injector 13 comprises a toric cavity 24 defined by upper and lower annular walls or platforms 18, 22, an outer cylindrical wall 19 and an inner cylindrical wall 27.

Toric cavity 24 is fed pressurized gas, generally compressed air, by radial pipes 25, connected to a pressurized gas source (not shown). Preferably, the pipes are evenly distributed over the periphery of the cavity and optionally are connected together by a toric pipe (also not shown). Advantageously, annular wall 18 and cylindrical wall 19 are integrally formed and annular wall 22 is formed as an integral extension of cylindrical wall 27. Cavity 24 exhausts an annular jet of gas into the upper end of mixing zone 12 through an annular slit 14.

Annular slit 14 is limited by upper and lower annular lips 16, 17. Lower lip 17 is formed by the rounded upper edge of cylindrical wall 27 surrounding tubular mixing zone 12, while upper lip 16 is an extension of upper wall 18 of injector 13. Upper lip 16 juts out above lower lip 17, covers it, is inclined slightly downward and is shaped so that the narrowest passage between the two lips 16 and 17 is located slightly back from their distal end.

Cylindrical outer wall 19 has a thread 20 on the inside of its lower edge which enables it to be screwed onto a matching thread 21 on the periphery of annular wall 22 to make injector 13 and the rest of mixer 10 a unitary construction. An O-ring 23 of adjustable thickness is inserted between the base of cylindrical wall 19 and the edge of wall 22. The width of annular slit 14 is made to vary by varying the position of wall 19 on thread 21 and thereby modifying the thickness of this ring.

Pipe 5 extends into injector 13 as far as annular slit 14. Since upper lip 16 of the slit has a diameter greater than that of pipe 5, an annular space 26 is provided around pipe 5 for intake of a gas by aspiration. To the extent that the suspension gas is air, space 26 is in communication with the atmosphere. In all other cases, space 26 is surmounted by a chamber (not shown) filled with the desired gas.

The gas blowing through annular slit 24 aspirates outside gas through space 26 and creates turbulences in the powder stream from pipe 5, causing an intense stirring of the powder and gas in mixing zone 12. The suspension is then accelerated downward in the direction of conical stabilization zone 15 and primary intake pipe 11.

Pipe 11 preferably has a relatively great length, at least on the order of 30 times its diameter, to improve still more the homogeneity of the suspension. As a result, a relatively homogeneous mixture arrives with a high speed at the intake of distributor 30.

If this preferred length is not met or exceeded during construction of the apparatus, the coating thus produced will suffer a reduction in its optical properties due to the formation of colored interference layers therein. These layers are directly attributable to the non-homogeneous powder distribution which occurs when the powder particles have not had a sufficient opportunity to mix with the carrier gas stream.

Applicants have conducted tests with an intake pipe having lengths of 15 and 20 times its diameter, and it was found that such intake pipe sizes produced defects in the coating. These defects were random and varied in position relative to the edges of the flat glass ribbon so as to produce a variation of coating thickness of as high as 10% of that desired for a uniform coating.

In an attempt to remedy this situation, tubes equipped with a succession of internal deflectors (e.g., Koenics tubes) were used to divide the flow of the powder into smaller, more uniform streams. The results achieved with the use of such tubes was even less effective than with intake pipes having lengths which are 15 or 20 times its diameter.

The problem of obtaining uniform coatings was finally resolved by using a longer intake pipe. Thus, it has been determined that intake pipes having lengths of 30, 35, 38 and 50 times their diameter are acceptable, provided that the verticality of the pipe and its alignment with the distributor cone are maintained as described above. Also, the powder size should preferably be in the range of between 5 and 40 microns and most preferably about 20 microns.

Different variants of a distributor 30 are shown in detail in FIGS. 3 to 6. As shown in FIG. 3, one variant of distributor 30 is made up of a solid 32, in which are pierced a plurality of identical cylindrical ducts such as 33 symmetrically distributed in an array over the lateral surface of a right circular cone 34 and converging at apex 35 or in the vicinity of apex 35 of cone 34. Ducts 33 meet near the apex of the cone to form a single intake 36 having the same cross-sectional area as that of all the ducts 33 in solid 32. Intake 36 is connected to primary intake pipe 11 which provides a straight, vertical flow path from mixer 10 to intake 36 and advantageously has a circular cross-section which flares slightly in a hyperboloid 37 at its junction with ducts 33 near the apex of cone 34. The angle at the apex of cone 34 is advantageously less than 22° so as to minimize the change in direction of flow of the homogeneous mixture from pipe 11, which has tendency to clog if there were a sudden change in direction. The axis of cone 34 is aligned with that of intake pipe 11 and typically is oriented in a vertical direction so that the distribution of powder will not be affected by gravity.

Pipe 11 must be constructed so as to facilitate a straight, vertical flow of the gas-entrained powder particles between mixer 10 and distributor 33, with which it is vertically aligned. In order to ensure that the coatings thus formed are not damaged by the presence of unacceptable colored interference layers, it is necessary to carefully monitor the angle of alignment between the axis of pipe 11 and cone 34 as well as the verticality of pipe 11 during the construction and operation of the apparatus. It has thus been determined that a misalignment of any more than 3 milliradians (i.e., 0.172°) between these two components is sufficient to cause/unacceptable variations in the coating thickness, whereas, in addition, if these components diverge from a vertical orientation by more than 6 milliradians (e.g. 0.344°) in any direction, the same result will occur and the resultant coated product will no longer be useful for its intended applications.

As shown in FIG. 3B, the distal end of each duct 33 which comes out at the base of cone 34 is connected to one of the secondary conduits 31. For convenience in fabrication, ducts 33 are cylindrical and consequently have a constant section, but they could also have a section that narrows slightly and regularly going downward.

To make the distributor 30 of FIGS. 3A and 3B is a delicate operation, the more delicate the greater the number of ducts 33 and the longer the length of the ducts pierced through solid 32. Any imperfection in the piercing or in the convergence of the bank of ducts 33 may alter the equal distribution of the suspension. Consequently, the present invention proposes another variant of distributor 30 that is easier to make, can provide any number of ducts 33, regardless of dimensions, and can be made by milling instead of piercing.

As shown in FIGS. 4 to 6, such a distributor 30' comprises a housing 40 provided with an intake 41 connected directly to vertical primary intake pipe 11 and having the same circular cross-section as pipe 11, a hollow region 42 whose cross-section expands away from the intake, and a right conical core 43 with a circular base that is located within the hollow region. Distributor 30' is also intended to be mounted vertically, with the vertical axis of housing 40 and conical core 43 aligned with the vertical axis of intake 41 and intake pipe 11.

Housing 40 comprises three superposed zones A, B and C. Upper zone A constitutes intake 41 which advantageously is threaded onto the end of primary intake pipe 11. In middle zone B the circular cross-section of hollow region 42 flares continuously outward so as to define, for example, the frustum of a conical object having circular bases with the smaller base contiguous to zone A. In this zone B the inner walls of housing 42 are preferably smooth. In zone C, the cross-section of hollow region 42 also flares continuously outward, again defining the frustum of a cone with circular bases; but in this region the angle of the walls (i.e., their conicity) is the same as that of conical core 43.

Core 43 is positioned in housing 40 so that its tip is flush with the level of the smaller base of the frustum of zone B and therefore is at the interface between zones A and B. Within zone B, the surface of core 43 is preferably smooth as are the opposing walls of housing 42. In zone C the surface of conical core 43 has a multiplicity of identical equally-spaced grooves 45, defined by ribs 46 and oriented along the generatrices of conical core 43. In conjunction with the inside surface of housing 40, these grooves form an array of identical ducts 47.

In zone B, there is an annular space 42' between conical core 43 and the wall of hollow region 42. The cross-section of this annular space 42' preferably is equal to the cross-section of main intake pipe 11 at every point in zone B. In this zone hollow region 42 can be shaped as the frustum of a right circular cone; but advantageously, to maintain a constant cross-section in the annular space 42' and to avoid any sudden change in direction of the suspension, it progressively widens downward having the shape of a hyperboloid of revolution. As in the case of distributor 30 of FIGS. 3A and 3B, the angle at the apex 44 of conical core 43 is advantageously less than 22° so as to avoid too great a deflection in the flow stream of the suspended powder. Zone B represents about 1/5 of the total height of distributor 30.

In zone C, ribs 46 end in a point at their upper end and form bevels 48 to minimize disturbances in the path of the suspension. Ducts 47 advantageously have a constant square cross-section, the total cross-sectional area being equal to that of annular space 42'. A square cross-section is easy to make by milling and can easily be transformed into a circular section for connection to one of secondary conduits 31 which are also circular. Alternatively, it is also possible to make the cross-section of ducts 47 so that it decreases slightly and regularly in the downward direction, although this will complicate production of the distributor. At the end of each duct 47 there is a connecting piece 49 connecting distributor 30' and secondary conduit 31.

As a result of this construction excessive deflection and disturbances in the flow stream are avoided so as to provide an optimal flow, while a single stream flowing straight down primary pipe 11 is divided into a multiplicity of secondary streams. These secondary streams are then fed to several points along the same distribution device such as a powder distribution nozzle 50, or to several such devices. On the inside of nozzle 50, the streams of suspended powder from secondary conduits 31 mix in the lengthwise direction of the nozzle so that a very uniform flow 51 emerges at its output. The powder, e.g., a metal compound, is deposited on substrate 52, e.g., a ribbon of hot glass, that is in continuous uniform movement in relation to the nozzle and pyrolyzes under the effect of the heat to form a layer 53, e.g., of a very uniform metal oxide.

In addition to the above described application of dividing streams of powder suspended in gases, distributors 30 and 30' can also be used to divide streams of gases and streams of liquids whether or not charged with other matter.

As will be apparent to those skilled in the art, numerous modifications may be made in the above-described invention. If desired, distributors can be associated in series so that a secondary stream from a first distributor constitutes the main stream fed to a second distributor.

What is claimed is:

1. An apparatus for mixing and distributing a powder entrained in a gas comprising:
   a primary intake pipe oriented to facilitate passage of said gas-entrained powder in a vertically downward flow direction wherein said flow of powder is subject to the least possible variation in direction to avoid formation of powder agglomerations and to prevent an uneven distribution of said powder among a plurality of secondary conduits located downstream therefrom, thereby preventing a negative effect on optical properties of a substrate coating produced therewith, said pipe having a length sufficient to facilitate passage of a homogeneous suspension of said powder therein; and
   means for forming a continuous stream of said gas entrained powder in said pipe said stream-forming means located above and terminating at a first end of said pipe; and
   an array of ducts distributed on a lateral surface of a cone having a circular cross section located within and aligned with a second end of said pipe, said array being located downstream of said stream forming means a sufficient distance to permit a thorough mixing of said powder with said carrier gas prior to the contact between said gas-entrained powder and said array, said ducts converging at or near the apex of said cone to constitute a single intake directed along the axis of the cone to said intake pipe, the total cross sectional area of said ducts being less than or substantially equal to that of said pipe, said ducts being oriented along generatrices on said surface of the cone and ending at its base in a multiplicity of orifices, each orifice connected to one of said plurality of said secondary conduits to form a continuous passageway which is free of dead zones, sharp bends and sharp turns to avoid formation of agglomerations or deposits of powder therein, so that said gas-entrained powder is uniformly divided from a single stream in said intake pipe to a plurality of uniform secondary streams in said secondary conduits, said cone being stationary relative to said intake pipe and said secondary conduits, said axis of said cone being oriented in a vertical direction.

2. The apparatus of claim 1 wherein said primary intake pipe is positioned in a substantially vertical orientation and provides a substantially straight flow path for said gas-entrained powder between said stream forming means and said duct array.

3. The apparatus of claim 2 wherein the alignment between the axis of said cone and that of said pipe does not vary more than three milliradians.

4. The apparatus of claim 2 wherein said pipe does not diverge more than six milliradians from a vertical direction.

5. The apparatus of claim 1 wherein said primary intake pipe is of a length on the order of at least about thirty times its diameter.

6. The apparatus of claim 1 wherein said array is located downstream of said stream forming means a distance on the order of about thirty times the diameter of said intake pipe.

7. The apparatus of claim 1 wherein said cone has an apex angle that is less than or equal to about 22°.

8. An apparatus for mixing and distributing a powder entrained in a gas comprising:
   a primary intake pipe oriented to facilitate passage of said gas-entrained powder in a vertically downward flow direction which is subject to a variation of no more than six milliradians from a true vertical direction to avoid formation of powder agglomerations and to prevent an uneven distribution of said powder among a plurality of secondary conduits located downstream therefrom, thereby preventing a negative effect on optical properties of a substrate coating produced therewith, a portion of said pipe located proximally upstream from said secondary conduits having a length on the order of about at least thirty times its diameter so as to facilitate passage of a homogeneous mixture of said powder with said carrier gas;
   means for forming a continuous stream of said gas entrained powder in said pipe; and
   an array of a predetermined number of ducts distributed on a lateral surface of a cone having an apex angle of less than or equal to 22° and a circular cross section located within said pipe and diverging no more than 3 milliradians from a vertical allignment therewith, said array being located downstream of said stream-forming means a distance on the order of at least about thirty times the diameter of said pipe, said ducts converging at or near the apex of said cone to constitute a single intake directed along the axis of the cone to said intake pipe, the total cross sectional area of said ducts being less than or substantially equal to that of said pipe, said ducts being oriented along generatrices on said surface of the cone and ending at its base in a multiplicity of orifices, each connected to one of a plurality of said secondary conduits to form a continuous passageway which is free of dead zones, sharp bends and sharp turns to avoid formation of agglomerations or deposits of powder therein, so that said gas-entrained powder is uniformly divided from a single stream in said intake pipe to a plurality of uniform secondary streams in said secondary conduits, said cone being stationary relative to said intake pipe and said secondary conduits, said axis of said cone being oriented in a vertical direction.

9. An apparatus for mixing and distributing a powder entrained in a gas comprising:

a straight, vertical primary intake pipe having a length at least about thirty times its diameter; for passage of gas-entrained powder in a vertically downward flow direction;

means for forming a continuous stream of gas-entrained powder in said pipe; and an array of a predetermined number of ducts distributed on a lateral surface of a cone having a circular cross section located within said pipe, said array being located downstream of said stream forming means a distance on the order of at least about thirty times the diameter of said pipe, said ducts converging at or near the apex of the cone to constitute a single intake directed along the axis of the cone to the vertical intake pipe, the total cross sectional area of said ducts being less than or substantially equal to that of said pipe, said ducts further being oriented along generatrices on an inner surface of the cone and ending at its base in a multiplicity of orifices, each orifice connected to one of a plurality of secondary conduits so as to form a continuous passageway which is free of dead zones, sharp bends and sharp turns to avoid formation of agglomerations or deposits of powder therein, so that said gas-entrained powder is uniformly divided from a single stream in said intake pipe to a plurality of uniform secondary streams in said secondary conduits, said cone being stationary relative to said intake pipe and said secondary conduits, said axis of said cone being oriented in a vertical direction.

10. The apparatus of claim 9 wherein said cone has an apex angle that is less than or equal to 22°.

11. An apparatus for mixing and distributing a powder entrained in a gas comprising:

a straight, vertical primary intake pipe having a length at least about thirty times its diameter;

means for forming a continuous stream of gas-entrained powder in said pipe;

an array of a predetermined number of ducts distributed on a lateral surface of a cone having a circular cross section located within said pipe, said array being located downstream of said stream forming means a distance on the order of at least about thirty times the diameter of said pipe, said ducts converging at or near the apex of the cone to constitute a single intake directed along the axis of the cone to the vertical intake pipe, the total cross sectional area of said ducts being less than or substantially equal to that of said pipe, said ducts further being oriented along generatrices on said surface of the cone and ending at its base in a multiplicity of orifices, each connected to one of a plurality of a secondary conduits so as to form a continuous passageway, said cone being stationary relative to said intake pipe and said secondary conduits, said axis of said cone being oriented in a vertical direction; and a housing having a hollow region that communicates with the primary intake pipe and flares outward with increasing distance from the intake pipe and a core shaped in the form of a cone and mounted in the hollow region so that the axis of the core is coincident with that of the primary intake pipe and the apex of the core is closer to the primary intake pipe, said ducts being formed by an inside surface of the housing and a plurality of grooves oriented along the generatrices of the cone.

12. The apparatus of claim 11 wherein the grooves have a square cross-section.

13. The apparatus of claim 11 wherein the grooves appear only on a lower part of the conical core, leaving a portion of the apex of said conical core free of grooves and advantageously smooth.

14. The apparatus of claim 13 wherein the portion that is free of grooves is about one-fifth of the height of the conical core.

15. The apparatus of claim 11 wherein a part of the hollow region of the housing covering the apex of the conical core has a hyperboloid shape.

16. The apparatus of claim 11 wherein the grooves are defined by ribs which end in bevels at the upper part of the conical core.

17. The apparatus of claim 11 wherein each of said grooves is defined by ribs having a beveled point of their upper end to minimize disturbances in the flow path of the gas entrained powder.

18. An apparatus for mixing and distributing a powder entrained in a gas comprising:

a pressurized gas injector having an annular gas jet for injecting a stream of gas flowing in a first direction;

means for feeding said powder in said first direction into a region surrounded by said gas jet;

a tubular mixing zone aligned in said first direction, downstream of said annular gas jet and said feeding means, in which said powder mixes with gas from said gas injector to form a continuous stream of gas-entrained powder;

a straight, vertical intake pipe aligned with and forming the downstream end of said mixing zone to facilitate passage of said gas-entrained powder in a vertically downward flow direction; and a distributor by which the vertical intake pipe is subdivided into a multiplicity of secondary conduits, comprising an array of a predetermined number of ducts distributed on a lateral surface of a cone having a circular section, said ducts converging at or near the apex of said cone to constitute a single intake directed along the axis of the cone and connected to the primary intake pipe, the total cross sectional area of said ducts being less than or substantially equal to that of said pipe and said ducts further being oriented along generatrices on said surface of said cone and ending at its base in a multiplicity of orifices, each connected to one of said secondary conduits so as to form a continuous passageway which is free of dead zones, sharp bends and sharp turns to avoid formation of agglomerations or deposits of powder therein, so that said gas-entrained powder is uniformly divided from a single stream in said intake pipe to a plurality of uniform secondary streams in said secondary conduits, said cone being stationary relative to said intake pipe and said secondary conduits, said axis of said cone being oriented in a vertical direction.

19. The apparatus of claim 18 wherein there is a space between the powder feeding means and the annular gas jet for input of a gas, generally ambient air.

20. The apparatus of claim 18 wherein the secondary conduits bring the powder entrained in the gas to a slit distribution nozzle.

21. The apparatus of claim 18 wherein the axis of the cone is aligned with the axis of the intake pipe.

22. The apparatus of claim 21 wherein the intake pipe has a length that is at least about thirty times its diameter.

23. The apparatus of claim 18 wherein the total cross-sectional area of the ducts equals that of the primary intake pipe.

24. An apparatus for mixing and distributing a powder entrained in a gas comprising:

means for mixing powder with gas to form a continuous homogeneous suspension of a gas-entrained powder;

a straight, vertical intake pipe having a length at least about thirty times its diameter, a first end of which is adjacent and located below said mixing means for directing said gas-entrained powder vertically downward to a second end of said pipe;

an array of a predetermined number of ducts distributed on the inner surface of a cone having a circular cross section located within said second end of the intake pipe, said ducts converging at or near the apex of the cone and having a total cross sectional area which is less than or substantially equal to that of said pipe, said ducts further being oriented along generatrices of said surface of the cone and ending at its base in a multiplicity of orifices; said cone being stationary relative to said intake pipe and said secondary conduits, said axis of said cone being oriented in a vertical direction; and a plurality of secondary conduits, each connected to one of the orifices to form a continuous passageway which is free of dead zones, sharp bends and sharp turns to avoid formation of agglomerations or deposits of powder therein, so that said gas-entrained powder is uniformly divided from a single stream in said intake pipe to a plurality of uniform secondary streams in said scondary conduits.

25. The apparatus of claim 24 wherein said cone has an apex angle that is less than or equal to 22° and wherein the single stream is divided into about 75 secondary streams.

26. The apparatus of claim 24 further comprising a distribution nozzle located adjacent and below said secondary conduits for conducting said secondary streams of gas-entrained powder vertically downward toward a substrate.

27. The apparatus of claim 26 wherein said substrate is glass, said powder contains a metal, and wherein the substrate is coated with a uniform deposit of powder which does not vary in thickness more than the diameter of the powder particles.

28. The apparatus of claim 24 wherein each of the ducts is configured in the form of a groove having a square cross section.

29. The apparatus of claim 24 wherein a portion of the cone extending from its apex to said array of ducts is substantially smooth to facilitate the distribution of gas-entrained powder into said ducts.

* * * * *